(12) United States Patent
Jacobsen et al.

(10) Patent No.: US 8,369,672 B2
(45) Date of Patent: Feb. 5, 2013

(54) SINGLE-POLARIZATION FIBER

(75) Inventors: William Jacobsen, Bolton, CT (US);
Jeffrey Mayfield, Sturbridge, MA (US);
Paula Fournier, Hampden, MA (US);
David Bolte, Brimfield, MA (US);
Hussein Elmaola, Worcester, MA (US);
Chih-Hao Wang, Brimfield, MA (US);
Gary Drenzek, Westfield, MA (US);
Abdelouahed Soufiane, Marlborough, MA (US)

(73) Assignee: Verrillon, Inc., North Grafton, MA (US)

( * ) Notice: Subject to any disclaimer, the term of this patent is extended or adjusted under 35 U.S.C. 154(b) by 301 days.

(21) Appl. No.: 12/768,443

(22) Filed: Apr. 27, 2010

(65) Prior Publication Data
US 2011/0262090 A1 Oct. 27, 2011

(51) Int. Cl.
*G02B 6/02* (2006.01)
(52) U.S. Cl. .................... 385/123; 385/124
(58) Field of Classification Search ........... 385/123–128
See application file for complete search history.

(56) References Cited

U.S. PATENT DOCUMENTS

| | | | |
|---|---|---|---|
| 4,515,436 A * | 5/1985 | Howard et al. | 385/126 |
| 4,913,521 A * | 4/1990 | Tajima et al. | 385/126 |
| 5,013,131 A * | 5/1991 | Fotheringham | 385/124 |
| 5,056,888 A | 10/1991 | Messerly et al. | |
| 6,807,350 B2 | 10/2004 | Soufiane et al. | |
| 6,903,865 B2 * | 6/2005 | Arbore | 359/341.1 |
| 6,970,631 B2 * | 11/2005 | Arbore | 385/123 |
| 6,995,900 B2 * | 2/2006 | Keaton et al. | 359/341.1 |
| 7,003,984 B2 | 2/2006 | Soufiane | |
| 7,724,422 B2 * | 5/2010 | Abramczyk et al. | 359/341.1 |
| 8,107,784 B2 * | 1/2012 | Borel et al. | 385/127 |

OTHER PUBLICATIONS

Messerly et al. (1991) "A Broad-Band Single Polarization Optical Fiber", Journal of Lightwave Technology 9(7):817-820.
Paye (2001) "An Analysis of W-Fibers and W-Type Fiber Polarizers", Master of ScienceThesis, Virginia Polytechnic Institute and State University.
Cohen et al. (1982) "Radiating Leaky-Mode Losses in Single-Mode Lightguides with Depressed-Index Claddings", IEEE Transactions on Microwave Theory and Techniques MTT-30(10):1455-1460.
Li et al. (2005) "High Performance Single Polarization Optical Fibers", Proc. of SPIE vol. 5623:612-621.

* cited by examiner

*Primary Examiner* — Daniel Petkovsek
(74) *Attorney, Agent, or Firm* — Goodwin Procter LLP

(57) ABSTRACT

Embodiments of the invention relate to a single-polarization fiber that may include a W-type refractive-index profile having a depressed region along an unguided principal axis of the fiber, and a quasi step-index profile along a guided principal axis of the fiber. The quasi step-index profile may have a depressed region with a radial extent at least twice that of the depressed region along the unguided axis.

10 Claims, 5 Drawing Sheets

SINGLE-POLARIZATION FIBER

TECHNICAL FIELD

In various embodiments, the invention relates to optical fibers, and more particularly to a single-polarization (PZ) fiber adapted, for example, to propagate only one polarization state of a fundamental mode over a wide polarization bandwidth.

BACKGROUND

Birefringence—a difference in the refractive index exhibited by a material along two axes with respect to incident electromagnetic waves with different polarizations—can occur only in materials having an anisotropic (directionally dependent) structure. Birefringence is often used in single-mode optical fibers that transmit light signals. For example, so called "polarization-maintaining" (PM) fibers use birefringence to maintain the polarization state of incident light as it travels through the fiber.

The most effective way of introducing high birefringence while maintaining a circular, single-mode output is by imparting asymmetric stress in the cladding region of the fiber (i.e., the region that surrounds the light-conducting fiber core). Stress results from a difference in thermal-expansion coefficient along the two orthogonal axes of the fiber and is transmitted to the fiber core. As explained, for example, in U.S. Pat. No. 5,056,888 to Messerly et al., the disclosure of which is incorporated herein by reference in its entirety, an asymmetric stress-applying region can be combined with selective doping through the radius of the fiber to create a "W index profile" along one or both orthogonal axes. The depressed-index regions of the fiber (i.e., the lower points of the W profile where the refractive index is below that of the cladding) provide a tunneling loss that extinguishes the unguided polarization state, and which increases rapidly with wavelength. This may be achieved by doping so as to produce different coefficients of thermal expansion (CTEs) along two axes of the fiber; this, in turn, results in anisotropic stress that splits the mode-effective indices so that the cutoff wavelength differs for the two polarizations.

Polarization control has been an important design challenge in fiber-optic devices and systems. Most advanced sensing systems, communication systems, as well as fiber laser systems require control of the polarization state in the optical fiber. Traditionally, PM fibers have been widely utilized to maintain the polarization state of a pre-polarized signal. However, a PM fiber typically suffers from mechanical, geometrical and temperature perturbations along its length, resulting in a decrease of the polarization extinction ratio for polarized light over the length of the fiber (and hence a degradation of polarization control). Thus, even PM fibers with very high birefringence still guide two polarization states, and their ability to preserve the light polarization degrades over the length of the fiber due to cross-talk between two polarization modes; this can be caused, for example, by sensitivity to alignment to the source, as well as extrinsic perturbations experienced by the fiber itself.

PZ fibers, by contrast, propagate only one polarization state of a fundamental mode over a wide polarization bandwidth. An exemplary prior-art PZ fiber is described in the '888 patent, with refractive-index profiles for the two axes of this fiber appearing in FIG. 1. As shown, the refractive-index profiles for both the guided axis ($x_1$) and the unguided axis ($x_2$) in the PZ fiber are W-type profiles (i.e., the profiles exhibit a substantially "W" shaped profile with respect to the radius from the center of the fiber). More particularly, both profiles have a central region within the core of the fiber (i.e., for a radius up to $r_a$) where the refractive index is greater than that of the refractive index of the cladding ($n_{cl}$), an intermediate region outside the core region (i.e., from $r_a$ to $r_b$, where $r_b$ corresponds to the outer radius of the intermediate doped region between the core and the cladding) where the refractive index has a depressed region lower than that of the cladding, and a cladding region extending out from the intermediate region. The cladding is formed, for example, from pure silica (having a refractive index, $n_{cl}$, of approximately 1.457) or lightly doped silica (having a refractive index, $n_{cl}$, of approximately 1.459). The refractive index along the guided axis generally differs from that of the unguided axis by a value $\delta_1$ (in the core region) and a value $\delta_2$ (in the intermediate region), with the unguided axis suffering more from leaky loss (which results in greater loss at shorter wavelengths), and the guided axis exhibiting significant leaky loss at longer wavelengths. As both axes have similar W-type profiles, these fibers merely maintain and guide the principle polarization modes along both axes, and cannot attenuate the light travelling therethrough to preserve only a single mode. In addition, under "macrobending" conditions (i.e., large bends that allow loss of light), both axes have significant leaky mode loss due to shifting of the refractive index, with the polarization bandwidth being significantly reduced under bending conditions.

A need exists, therefore, for an improved optical fiber capable of effectively overcoming the limitations of conventional PM and PZ fibers.

SUMMARY OF THE INVENTION

The invention relates to PZ fibers where one and only one polarization mode is maintained in the fiber over a wide polarization bandwidth. Unlike PM fibers, which maintain and guide both principal polarization modes in the fiber, a "single-polarization" fiber in accordance with the present invention selectively attenuates the light propagating along one polarization axis (the "unguided state") and preserves only the polarized light along the other principal axis (the "guided state"). The advantages of eliminating the unwanted polarization mode include higher extinction ratio, low polarization cross-talk, high-tolerance for polarization alignment, no polarization-mode dispersion, and no mode double-coupling between the two polarization modes.

In one aspect, the invention relates to a PZ fiber including a W-type refractive-index profile having a depressed region along an unguided principal axis of the fiber and a quasi step-index profile along a guided principal axis of the fiber, where the quasi step-index profile has a depressed region with a radial extent at least twice that of the depressed region along the unguided axis. The fiber may have a substantially circular output. In one embodiment, the fiber includes a core region surrounded by a cladding region. The W-type profile of the unguided axis may exhibit a finite cutoff of the fundamental mode between the core region and the cladding region.

In one embodiment, the quasi step-index profile includes a predominantly curved (e.g., predominantly negatively curved) index profile extending through an annular thickness beginning at the core region or at a point radially beyond the core region. By "curved" is meant simply that the index is not constant along the radius. By "predominantly curved" is meant that, over the relevant radial extent, regions of index variation predominate over regions where the index is constant (i.e., the index varies more than it remains constant so that, for example, the index is constant over no more than 10% of the radial extent). By "predominantly negatively curved" is meant that, over the relevant radial extent, regions where the index is depressed relative to the surrounding cladding predominate over regions where the index is not depressed (i.e., where it is equal to or greater than the index of the cladding) so that, for example, the index is depressed over at least 90% of the radial extent.

The core may have a radius r. The predominantly curved index profile may begin at a radius no greater than 1.2r and, for example, at a radius of between r and 1.2r. The negatively curved index profile may, for example, describe a parabola.

The W-type refractive-index profile along the unguided principal axis may have a depressed region relative to a refractive index of an outer cladding and, for example, a refractive index of silica, the predominantly curved index profile having an annular thickness at least 10 times an annular thickness of the depressed region of the W-type refractive-index profile along the unguided principal axis. A radial concentration gradient of at least one downdopant may extend through the annular thickness to define the predominantly curved index profile. An internal stress profile may also contribute to the predominantly curved index profile.

As used herein, the term "downdope" refers to the addition of one or more dopants that lower the refractive index or to the use of a dopant concentration or combination which, relative to an adjacent layer, achieves a lower index than that layer (e.g., through use of a lower concentration of an index-raising dopant, or a higher concentration of an index-decreasing dopant); similarly, the term "updope" refers to the addition of one or more dopants that raise the refractive index or to the use of a dopant concentration or combination which, relative to an adjacent layer, achieves a higher index than that layer. Typical index-raising dopants include, for example, germanium, phosphorus, titanium and aluminum, while fluorine and boron are common index-lowering dopants.

In one embodiment, the W-type refractive-index profile along the unguided principal axis has a depressed region relative to silica. The depressed region has a maximum depression, and the predominantly curved region has a maximum depression, relative to silica, less than the maximum depression of the W-type refractive-index profile along the unguided principal axis. In another embodiment, the depressed region has an average depression value, and the predominantly curved region has an average depression value, relative to silica, less than the average depression value of the W-type refractive-index profile along the unguided principal axis.

These and other objects, along with advantages and features of embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

In general, embodiments of the present invention relate to a highly manufacturable, low-cost, compatible single-polarization (PZ) fiber, which can provide a significantly wider polarization bandwidth than is available in conventional fibers. The PZ fibers described herein may also provide superior polarization extinction ratios and performance consistency. In one embodiment, they exhibit a polarization extinction ratio (PER) greater than 40 dB, and a polarizing bandwidth wider than 200 nm as measured on fiber lengths as short as, or shorter than, 4 m. Similar results can be achieved with longer lengths of uncoiled PZ fiber. In various embodiments, changing the length and/or coil diameter of the PZ fiber allows for adjustment of the polarization wavelength window to any desirable spectral range. This may, for example, afford more flexibility when designing optical devices and systems.

Embodiments of the invention relate to PZ fibers for use over a variety of fiber lengths and in diverse applications. The PZ fiber described herein may be utilized, for example, for applications such as, but not limited to, in-line polarizers requiring less than 10 m of fiber or open-loop gyroscopes requiring relatively long (e.g., >300 m) fiber spans.

In addition, various embodiments of the invention may be designed with a circular mode field, which makes the fiber low-loss and highly compatible with standard single-mode fiber systems and devices. One embodiment, for example, provides a circular single-mode output. This may be achieved, for example, by introducing asymmetric stress in the cladding region of the fiber. Due to the difference in the thermal expansion coefficients along the two orthogonal axes, stress is induced in the fiber core, which results in a difference in refractive indices along the two orthogonal axes, thereby creating birefringence.

Figure 1:
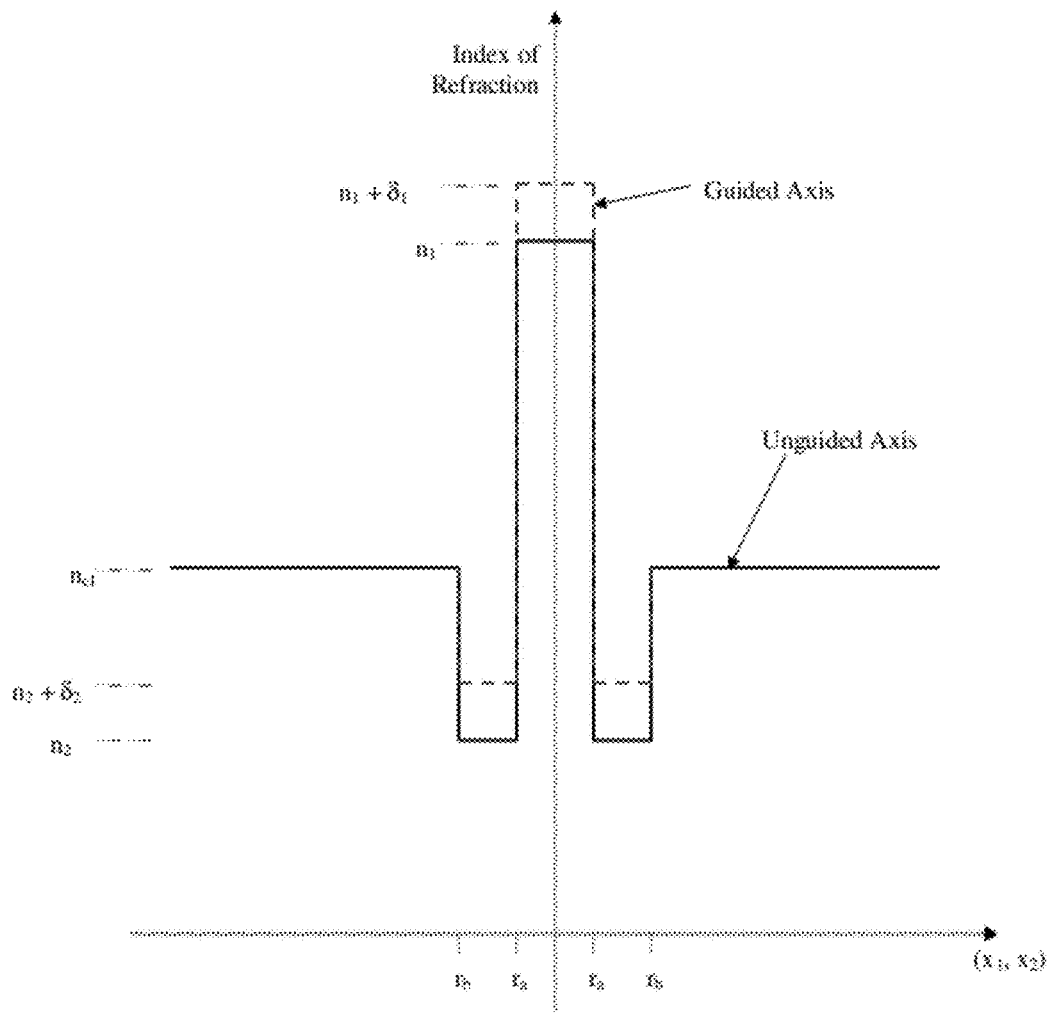
FIG. 1 is a graph of the refractive-index profile for a prior-art PM fiber.
Figure 2:
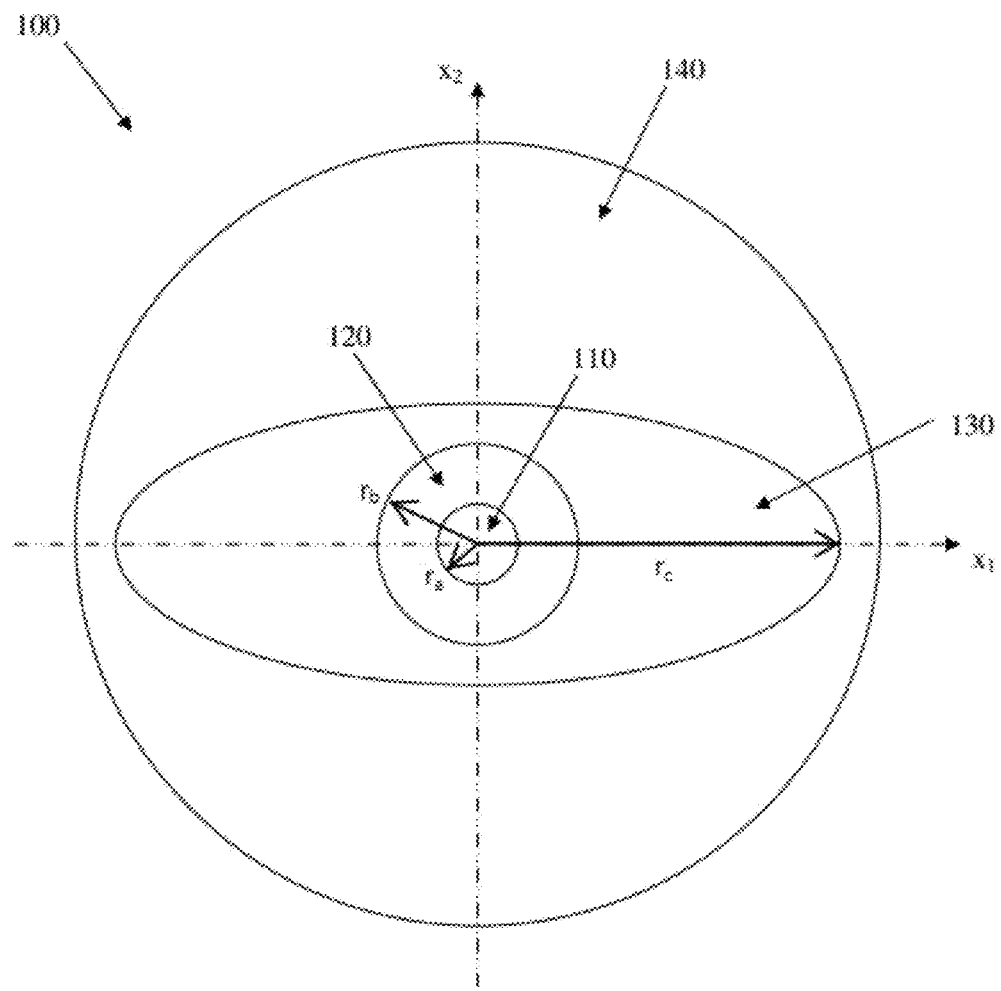
FIG. 2 is a schematic cross-sectional view of a PZ fiber, in accordance with one embodiment of the invention.

An exemplary PZ fiber 100, in accordance with one embodiment of the invention, is shown in FIG. 2. The fiber 100 includes a core 110, an intermediate region 120, an elliptical stress-applying region 130, and an outer cladding 140. In an alternative embodiment, additional layers such as, but not limited to, an elliptical outer barrier region between the elliptical stress-applying region 130 and the outer cladding 140, may be included in the fiber.

The core 110 may be an essentially round core having an outer radius $r_a$. The core 110 may be formed, for example, from pure silica or a silica-based material (e.g., silica doped with an index-raising material such as germanium or phosphorus). The intermediate region 120 may be an essentially round portion surrounding the core 110. The intermediate region 120 may be formed, for example, from silica doped with a material such as, but not limited to, fluorine.

The stress-applying region 130 is formed to have an elliptical, or substantially elliptical, cross-section with a major diameter along a first principal axis $x_1$, and a minor diameter along a second perpendicular principal axis $x_2$. The elliptical stress-applying region 130 may be formed, for example, from silica downdoped with a material such as, but not limited to, boron. The outer cladding 140 may be formed from pure silica, or from a lightly doped silica, to provide an outer barrier for the fiber 100.

The fiber 100 may have a substantially circular output, thereby allowing the fiber 100 to be easily coupled to existing circular fibers with minimal loss. The PZ fibers described herein may be drawn to any appropriate diameter to be compatible with any other commercially available fiber-optic fittings, connectors and cables. For example, a fiber 100 may have a diameter from 40 to 120 μm and may operate at wavelengths such as 830 nm, 1060 nm, 1300 nm, or 1550 nm.

Figure 3:
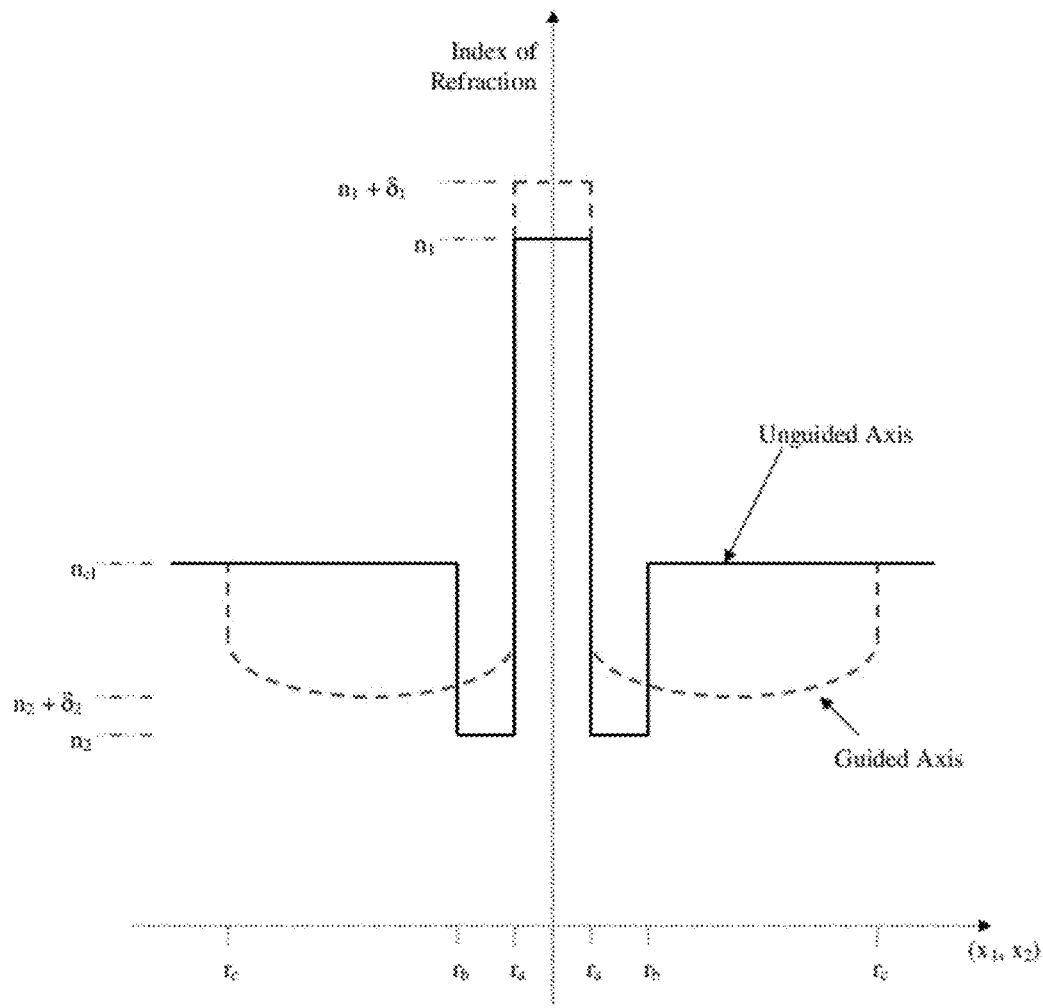
FIG. 3 is a graph of the refractive-index profile of a PZ fiber, in accordance with one embodiment of the invention.

In one embodiment, improved fiber performance is achieved through creation of a unique refractive-index profile along the guided and unguided axes. An exemplary profile for each of the guided and unguided axes ($x_1$, $x_2$) of a PZ fiber 100 is shown in FIG. 3. The refractive-index profile along the unguided axis ($x_2$) of the PZ fiber 100 is a W-type profile similar, for example, to those produced along both axes of the PM fiber described in the '888 patent. However, unlike in PM fibers, the refractive-index profile along the guided axis ($x_1$) of the PZ fiber 100 differs greatly from the refractive-index profile along the unguided axis ($x_2$). These refractive-index profiles along the guided and unguided axes enable the PZ fiber 100 to selectively attenuate the light propagating along the unguided axis while preserving the polarized light along the guided axis, thereby resulting in a fiber 100 capable of maintaining one and only one polarization mode along its length.

In this embodiment, the PZ fiber 100 is formed, for example, through selective doping during manufacture to provide a fiber 100 having a W-type refractive-index profile along an unguided principal axis, and a quasi step-index profile along the guided principal axis as described in greater detail below. The difference in the refractive indices $\delta_1$ in the core region 100 is, for example, due at least in part to photo-elastic effects induced by the asymmetric stress in the fiber 100. A radial concentration gradient of at least one downdopant may extend through the annular thickness of the fiber 100 to define the predominantly curved index profile of the guided principal axis. An internal stress profile may also contribute to the predominantly curved index profile of the guided principal axis.

The W-type profile of the unguided axis shown in FIG. 3 may exhibit a finite cutoff of the fundamental mode between the core region 110 (i.e., the region having a radius less than $r_a$) and the cladding region 140. In particular, the refractive index of the unguided axis has a value $n_1$ (e.g., 0.004) within the core region 110 (i.e., for a radius up to $r_a$), while the refractive index of the guided axis has a value $n_1+\delta_1$ within the core region 110. For example, $\delta_1$ may be on the order of 0.0007.

In the intermediate region 120 outside the core region 110 (i.e., $r_a < r < r_b$), the refractive index of the unguided axis ($x_2$) has a depressed region relative to silica and, as such, is reduced to a value $n_2$ (where $n_2 < n_{cl}$, the refractive index of the cladding; in the case of silica, $n_{cl}$ is approximately 1.457) by downdoping. For example, $n_2$ may be on the order of −0.001. The depressed region of the unguided axis extends within an annular region from the core radius $r_a$ to $r_b$, i.e., through the thickness of the intermediate region 120. Beyond the radius $r_b$, the refractive index of the unguided axis is equal to, or substantially equal to, the refractive index $n_{cl}$ of the cladding region.

The refractive index of the guided axis ($x_1$) has a quasi step-index profile that includes a predominantly curved portion extending through an annular thickness beginning at the terminus of the core region (i.e., at radius $r=r_a$), or at a point radially beyond the core region. The profile is a "quasi step index" in that the bottom portion of the step varies, i.e., is curved. Preferably, the predominantly curved region begins at a radius no greater than $1.2r_a$ and, for example, at a radius of between $r_a$ and $1.2r_a$. In one embodiment, the negatively curved index profile describes a parabola, or a substantially parabola-shaped curve.

In embodiments where the predominantly curved index profile begins at a radius greater than $r_a$, the refractive index of the guided region between $r_a$ and the radius at which the negatively curved index profile begins may be substantially constant. In one embodiment, the refractive index within this region is less than $n_{cl}$ but greater than $n_2$.

In the illustrated embodiment, the predominantly curved region extends out to a radius of $r_c$ (i.e., through an annular region from between $r_a$ and $1.2r_a$ out to $r_c$, which corresponds to the long axis of the region 130). In general, the annular thickness of the predominantly curved region of the guided axis is at least twice the annular thickness of the depressed region of the W-type refractive-index profile along the unguided principal axis—i.e., $(r_c-r_a) \geq 2(r_b-r_a)$. But in some embodiments, the ratio of the annular thickness of the predominantly curved region to the annular thickness of the depressed region of the W-type refractive-index profile is greater than 10. In various embodiments, $r_b \geq 2r_a$ and $r_c \geq 10r_a$.

In one embodiment, the W-type refractive-index profile along the unguided principal axis has a maximum depression of greater magnitude (i.e., more depressed), relative to silica, than the maximum depression of the predominantly curved region. For example, as shown in FIG. 3, the refractive-index value of the unguided axis at maximum depression (i.e., between $r_a$ and $r_b$) is $n_2$, while the refractive-index value of the guided axis at maximum depression may be $n_2+\delta_2$. In general, $\delta_2=\delta_1$. In the illustrated embodiment, the depressed region of the unguided axis has a substantially constant value. In other embodiments, the refractive index of the unguided axis may vary over the annular distance from $r_a$ to $r_b$, with an average value of $n_2$.

The refractive-index profile of the guided axis may, in some cases, have a maximum depression of greater magnitude than the maximum depression along the guided axis, so long as the average depression along the guided axis exceeds the average depression along the unguided axis. In other words, $\delta_2$ may not be positive at every point along the quasi step region.

The W-type profile of the unguided axis may exhibit a finite cutoff of the fundamental mode $LP_{01}$ through a tunneling effect between the oscillating field in the core 110 and the cladding 140. Whether the fundamental mode cutoff exists may be defined by the following equations:

$$\int_A (n^2 - n_{cl}^2) \cdot dA > 0$$

$$\int_A (n^2 - n_{cl}^2) \cdot dA \leq 0$$

where n is the refractive index of the waveguide and dA is an area element of the waveguide so that the integration is over the waveguide cross-section.

When the mode is not always guided inside the fiber, the mode field diameter is no longer tightly confined to the core, but forms a radial traveling wave in the outer cladding 140. This situation represents a leaky mode. An approximate leakage loss coefficient for the W-type waveguide (along the unguided axis) can be modeled and characterized as:

$$2\alpha = (2\pi\kappa^2 \gamma \sigma e^{-2\gamma b})/(\beta n_{cl}^2 \kappa^2 |\Delta'| V_2^2 K_1^2(\gamma a))$$

with:

$$V2 = k a n_{cl}(2(\Delta-\Delta'))^{1/2} = [(\kappa a)^2 + (\gamma a)^2]^{1/2}$$

where $2\alpha$ corresponds to the loss (db/km); $\Delta = n_1 - n_{cl}$; $\Delta' = n_{cl} - n_2$; $K_1$ is a first-order K-Bessel function; $k=2\pi/\lambda$ (the propagation constant of a plane wave in free space); $\beta$ is the modal propagation constant; a corresponds to the core radius ($r_a$); b corresponds to the cladding radius ($r_b$); and the following equations apply:

$$\Delta = [n(\text{core}) - n(\text{outer cladding})]/n_0, \text{ where } n_0 \text{ is the refractive index of silica}$$

$$\Delta' = [n(\text{inner cladding}) - n(\text{outer cladding})]/n_0$$

$$\kappa = [n_0^2(1+\Delta)^2 k^2 - \beta^2]^{1/2}$$

$$\gamma = (\beta^2 - n_0^2(1+\Delta')^2 k^2)^{1/2}$$

$$\sigma = (n_0^2 k^2 - \beta^2)^{1/2}$$

The model is based on using simple radiation loss for the operating wavelength longer than the fundamental cutoff wavelength.

This leakage loss will therefore decrease when the inner cladding (i.e., the stress-applying region 130) thickness increases or when the inner cladding depression (i.e., $n_2 + \delta_2 - n_{cl}$) decreases. The step-index-like refractive-index profile of the guided state is equivalent to that of the wide depressed-cladding—i.e., extending out to $r_c$ along the guided axis $x_1$. The leakage loss is also minimized with higher refractive-index values ($n_2 + \delta_2$) for the inner cladding. However, the modes of the guided state may experience some level of macrobending loss if the fiber 100 is coiled. The macrobending loss is estimated as:

$$\alpha = A_R + A_C R^{-1/2} e^{-UR}$$

where $$A_R = -10 \log(1 - 890 \cdot w_o^6/(\lambda 4 R 2))$$

$$A_C = 30(\Delta n)^{1/4} \lambda^{-1/2} (\lambda_c/\lambda)^{3/2}$$

$$U \approx 0.705(\Delta n)^{3/2}/\lambda \cdot (2.748 - 0.996 \cdot \lambda/\lambda_C)^3$$

$A_R$ is transition loss from mode coupling in the fiber, and $A_C$ is the bending-induced loss. $\Delta n$ is the index difference between core and cladding, R is the radius and $\lambda_c$ is the cutoff wavelength.

The PZ fibers described herein may be compatible with standard single-mode fiber with circular core and mode field output. The circular core design is, for example, of great importance in minimizing coupling and splicing losses experienced with shaped-core fibers, and therefore may make PZ fiber 100 highly desirable in manufacturing environments and commercial applications. In general, the PZ fibers described herein may be drawn to any appropriate diameter to be compatible with any commercially available fiber-optic fittings and cables. For example, a representative fiber 100 has a diameter of 80 μm for operation at 850 nm or a diameter of 125 μm for operation at 1300 nm. As a result, the PZ fibers described herein are readily combined with standard single-mode fibers having a circular core and mode field diameter, thereby allowing them to efficiently replace traditional polarizers where all-fiber systems are desirable.

Figure 4:
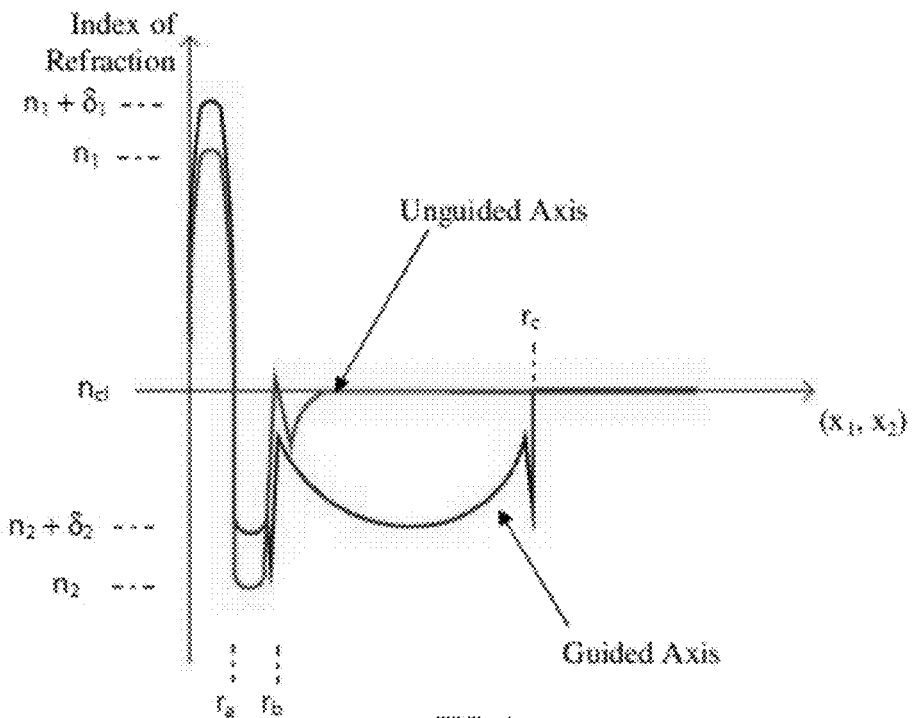
FIG. 4 is a graph of the refractive-index profile for another PZ fiber, in accordance with one embodiment of the invention.
Figure 5:
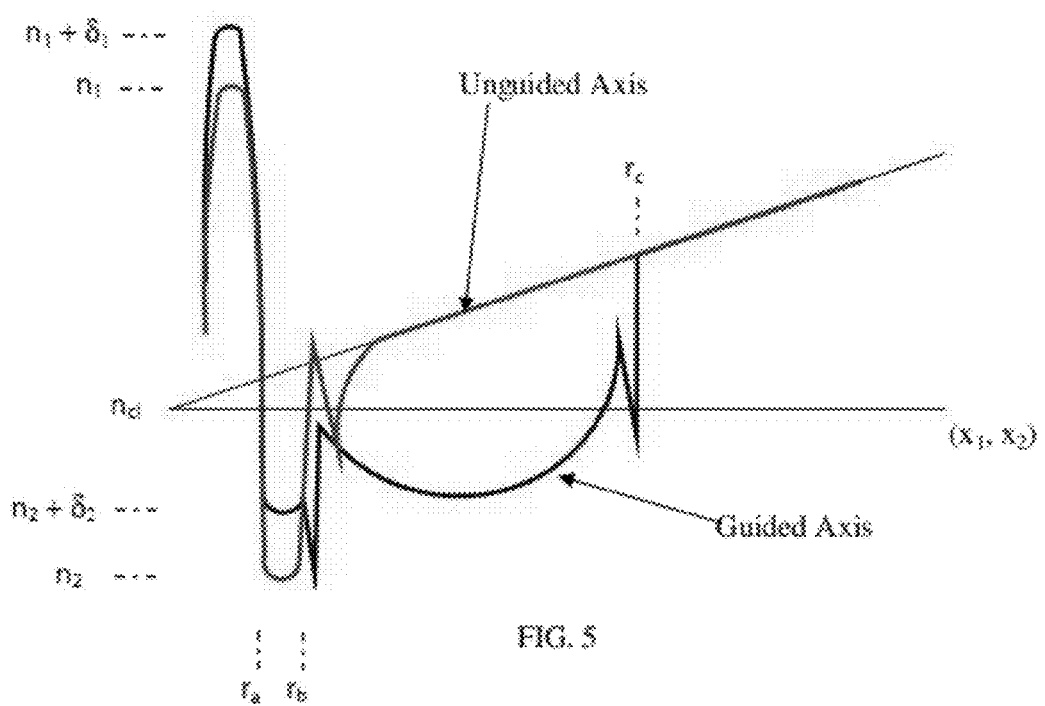
FIG. 5 is a graph of the refractive-index profile for the PZ fiber of FIG. 4 under bending, in accordance with one embodiment of the invention.

In one embodiment, the PZ fibers 100 described herein may exhibit substantially improved performance even under bending. The refractive-index profiles for a PZ fiber 100 when straight and under macrobending are shown in FIGS. 4 and 5, respectively. With reference to FIG. 5, even when the fiber 100 is bent, the leaky loss of the guided axis in the depressed region will not increase significantly, and will therefore suffer minimum loss due to the leaky modes. In contrast, the unguided axis will still have a high leaky loss, resulting in the ability to increase the polarization bandwidth due to the difference between the leaky-mode loss of the guided and unguided axes under bending. More particularly, the step-index-like refractive-index profile of the guided axis ($x_1$) remains lower than the refractive index of the cladding ($n_{cl}$) even under significant bending, while the refractive-index profile of the unguided axis ($x_2$) is greater than refractive index of the cladding ($n_{cl}$) substantially directly outside the core region.

Figure 6:
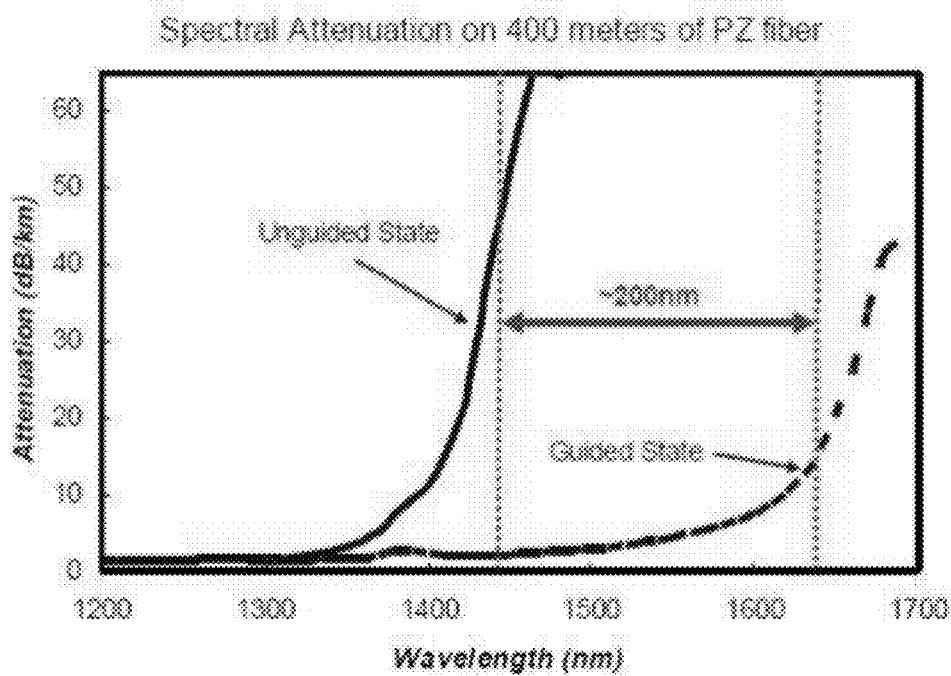
FIG. 6 is a graph of spectral attenuation of a 400 m length of PZ fiber, in accordance with one embodiment of the invention.

In general, the PZ fibers 100 described herein exhibit excellent polarizing capability in both straight and coiled configurations. As a result, very wide polarizing bandwidths (e.g., >200 nm) as well as high extinction ratios (e.g., >40 dB) can be achieved with fiber lengths as short as 3-4 m. Polarization extinction ratios greater than 40 dB, can benefit many sensing, communications and laser applications. An example of the spectral attenuation for both the unguided and guided axes for a 400 m length of fiber 100 is shown in FIG. 6. In this embodiment, a polarization bandwidth of ~200 nm, with an extinction ratio in excess of 30 dB, is achieved.

Figure 7:
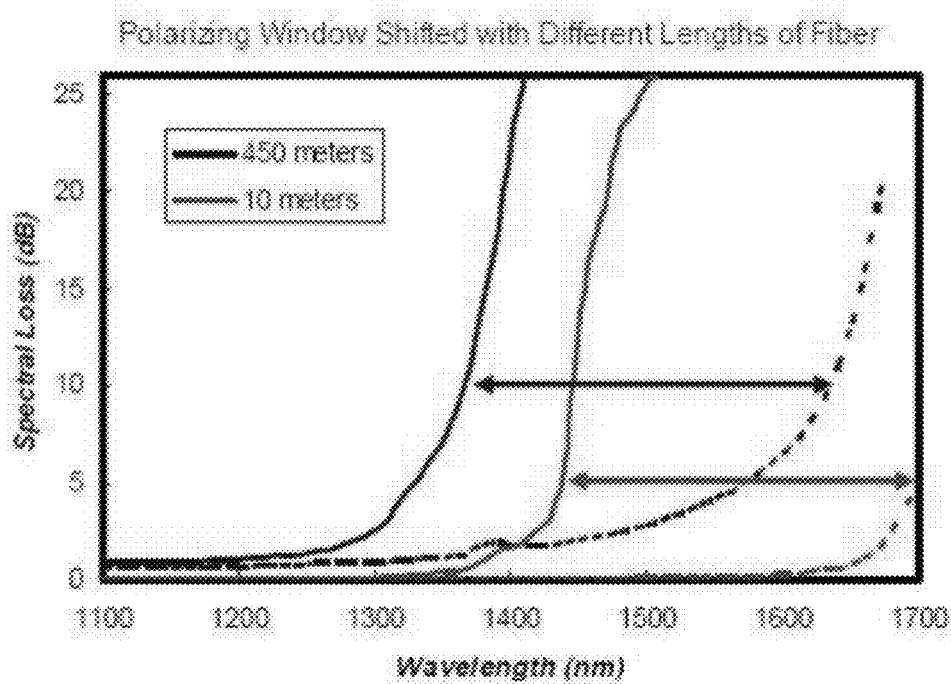
FIG. 7 is a graph of spectral attenuation for various lengths of PZ fiber, in accordance with one embodiment of the invention.

The wavelength of the polarizing window for a PZ fiber 100 changes with the length of the fiber 100. A graph showing the polarization bandwidth for two different lengths of fiber 100 (namely, 10 m and 450 m) is shown in FIG. 7. As a result, the polarization bandwidth can be optimized to provide any required bandwidth, depending upon the specific requirements of a system utilizing single polarization, through proper selection of the fiber length. In addition, in various embodiments of the invention, the fundamental mode cutoff of the unguided state undergoes a shift when the fiber is under different deployment conditions. For example, tighter bend radii tend to shift the fundamental mode cutoff to shorter wavelengths as well as increase the bending loss of the fundamental mode. As a result, by manipulating the bending radius, different polarization bandwidths can be achieved with the same fiber 100.

Various embodiments of the invention may be manufactured, for example, through methods including, but not limited to, modified chemical vapor deposition (MCVD), a combination of conventional MCVD and aerosol deposition, outside vapor deposition (OVD), vapor axial deposition (VAD), and/or plasma vapor deposition (PVD).

For example, conventional MCVD processes generally involve a glass tube that is rotated by a lathe at a constant rate. A torch producing a flame repeatedly travels longitudinally from one end of the glass tube to the other and back. A heat control unit controls the temperature of the torch, for example by varying the mixture of $O_2$ and $H_2$ provided to the torch. As the tube is rotated and heated, various chemical compounds in the vapor phase are carried by oxygen into the glass tube through a gas feed pipe (conduit), which is in communication with a connector at one end of the glass tube. The compounds may, for example, be conducted from a plurality of bubblers and can include, for example, $SiCl_4$, which is used to generate SiO$_2$, often a main constituent of optical fiber material; GeCl$_4$, used to obtain GeO$_2$ for controlling a refractive index of the fiber core or cladding; and POCl$_3$. The rates at which the compounds enter the glass tube are controlled by mass flow controllers, each of which controls the flow of a carrier gas, for As the compounds enter the glass tube, they react in the interior region of the tube which is heated by the flame from the torch. The SiO$_2$ is deposited on the wall of the glass tube in the solid phase, as soot particles, and Cl$_2$ and any unreacted compound is exhausted from the glass tube in a gaseous state. Typically, the soot particles follow the heat gradient and deposit ahead of the flame. Layer upon layer of material is deposited within the glass tube as the torch successively passes over the axial length of the tube.

In one exemplary embodiment, PZ fiber 100 can be formed by depositing siliceous layers onto the interior surface of a hollow substrate tube of a silica such as, but not limited to, quartz. In certain embodiments, commercially available hollow quartz substrate tubes may contain impurities that could make it difficult to deposit heavily doped silica. As such, in one embodiment of the invention, a first siliceous layer of pure silica or lightly doped silica is first deposited to provide an outer barrier having a refractive index $n_{cl}$. When the first layer is pure or lightly doped silica, the next layer to be deposited forms a stress-applying region and, for example, may be downdoped to have a refractive index less than $n_{cl}$. Within this layer are the intermediate region and a core region.

After collapsing the coated substrate tube to provide a preform, two diametrically opposed parallel flat faces are ground into the outer surface of the preform. Upon pulling the ground preform to form the PZ fiber, the outer surface of the PZ fiber becomes cylindrical, and the stress-applying region becomes elliptical. In certain embodiments, rather than grinding flat faces into the preform, the preform can be flattened and drawn while so controlling the temperature to produce a PZ fiber, the outer surface of which is substantially elliptical. In an alternative embodiment, the PZ fiber can take other forms such as, but not limited to, a PANDA configuration.

The core 110 of the PZ fiber 100 may be silica doped with germanium oxide, and the intermediate region 120 may be silica doped with fluorine. In one embodiment, if the PZ fiber 100 contains phosphorous, it may be desirable for its outer barrier to be silica doped with both P$_2$O$_5$ and F, the former dopant lowering its deposition temperature, and the latter offsetting the change in refractive index that otherwise would result from the presence of the phosphorous.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A single-polarization optical fiber comprising:
    a core region and a cladding region surrounding the core region,
    a W-type refractive-index profile having a first depressed region along an unguided principal axis of the fiber; and
    a quasi step-index profile along a guided principal axis of the fiber, the quasi step-index profile having a second depressed region with a radial extent at least twice a radial extent of the first depressed region along the unguided axis,
    wherein (i) the fiber has a substantially circular output, (ii) the W-type profile of the unguided axis exhibits a finite cutoff of the fundamental mode between the core region and the cladding region, and (iii) the quasi step-index profile comprises a predominantly curved index profile extending through an annular thickness beginning at the core region or at a point radially beyond the core region.

2. The fiber of claim 1 wherein the core has a radius r and the predominantly curved index profile begins at a radius no greater than 1.2r.

3. The fiber of claim 1 wherein the W-type refractive-index profile along the unguided principal axis has a depressed region relative to a cladding of the fiber, the predominantly curved index profile having an annular thickness at least 10 times a core radius of the fiber.

4. The fiber of claim 1 wherein:
    the first depressed region of the W-type refractive-index profile along the unguided principal axis is depressed relative to silica;
    the first depressed region has a first maximum depression; and
    the second depressed region of the predominantly curved region has a second maximum depression, relative to a cladding of the fiber, less than the first maximum depression of the W-type refractive-index profile along the unguided principal axis.

5. The fiber of claim 1 wherein:
    the first depressed region of the W-type refractive-index profile along the unguided principal axis is depressed relative to silica;
    the first depressed region has a first average depression value; and
    the second depressed region has a second average depression value, relative to a cladding of the fiber, less than the first average depression value of the W-type refractive-index profile along the unguided principal axis.

6. The fiber of claim 1 wherein the curved index profile describes a parabola.

7. The fiber of claim 1 wherein a radial concentration gradient of at least one index-decreasing dopant extends through the annular thickness to define the predominantly curved index profile.

8. The fiber of claim 7 wherein an internal stress profile also contributes to the predominantly curved index profile.

9. The fiber of claim 1 wherein a radius of the cladding is at least two times a radius of the core.

10. The fiber of claim 1 further comprising an elliptical stress-applying region surrounding the core and cladding, the stress-applying region having a long axis, the long axis having a length at least 10 times a radius of the core.

* * * * *